United States Patent [19]

White et al.

[11] 4,324,885
[45] Apr. 13, 1982

[54] QUATERNARY GROUP VA SALT CATALYZED METHOD FOR MAKING POLYETHERIMIDE

[75] Inventors: Dwain M. White, Schenectady, N.Y.; David G. Keyes, Minneapolis, Minn.

[73] Assignee: General Electric Company, Schenectady, N.Y.

[21] Appl. No.: 190,594

[22] Filed: Sep. 25, 1980

[51] Int. Cl.³ ............................................. C08G 73/10
[52] U.S. Cl. .................................................... 528/207
[58] Field of Search .................... 528/21, 23, 173, 207

[56] References Cited

U.S. PATENT DOCUMENTS 3,847,870 11/1974 Takekoshi ............................ 528/14
3,850,885 11/1974 Takekoshi et al. ................... 528/14
3,998,840 12/1976 Williams et al. ..................... 528/14

OTHER PUBLICATIONS

4-Dialkylaminopyridines as Highly Active Acylation Catalysts, Hofle et al., Angew. Chem. Int. Ed. Engl. 17, pp. 569–583 (1978).
Structural Effects on the Rates of Formation of Amic Acids and Imides, Dror et al., J. Chem. Soc., Perkin II, 1425 (1974).
NASA Tech. Brief, PB80-972160, ARC-11107, Improved Imide Polymerization Catalyst.
A Study of Base-Catalyzed and Salt-Catalyzed Acetylation of Hydroxyl Groups, Schenk et al., Anal. Chem., 34 914–919, (1964).
Preparation of Acyclic Imides, Hurd et al., J. of Org. Chem., vol. 24, pp. 388–392 (1959).
Cyclization of Aromatic Polyamido Acids to Polyimides, Lavrov et al., Chemical Abstracts, vol. 87 (1977), p. 4.
A Case History of Transmuting an Idea into Money, M. Orchin., J. of Chem. Education, p. 782.
The Preparation of Phthalamic Acids and their Conversion into Anthranilic Acids, Chapman et al., J. Chem. Soc. 127, 1791 (1925).

Primary Examiner—Maurice J. Welsh
Attorney, Agent, or Firm—William A. Teoli; James C. Davis, Jr.

[57] ABSTRACT

A method is provided for making polyetherimides, based on the use of certain quaternary Group VA salts, for example tetra-alkylammonium halides, to accelerate the intercondensation of aromatic bis(ether anhydride) and organic diamine under solution or melt polymerization conditions. The resulting polyetherimides are high performance, injection moldable thermoplastics.

6 Claims, No Drawings

QUATERNARY GROUP VA SALT CATALYZED METHOD FOR MAKING POLYETHERIMIDE

CROSS REFERENCE TO RELATED APPLICATIONS

Reference is made to our copending applications Ser. No. 190,613, filed Sept. 25, 1980. Organic Amine Catalyzed Method for Making Polyetherimide, Ser. No. 118,756, filed Sept. 19, 1980, A Method for Making Polyetherimide, RD-12236, Method for Making Polyetherimides and Takekoshi, Ser. No. 118,755, filed Sept. 19, 1980, A Method for Making Polyimides, where all of the aforementioned applications are assigned to the same assignee as the present invention.

BACKGROUND OF THE INVENTION

The present invention relates to a method for making polyetherimides by effecting reaction between aromatic bis(ether anhydride) and an organic diamine under solution polymerization conditions. More particularly, the present invention relates to the use of certain quaternary salts of Group Va elements as polymerization catalysts for making aromatic polyetherimides.

Prior to the present invention, certain catalysts, such as sodium chloride and ferric sulfate, as shown by Williams et al, U.S. Pat. No. 3,998,840, assigned to the same assignee as the present invention, were used to enhance the rate of formation of polyetherimide under melt polymerization conditions. Although valuable results were achieved by such procedures, it was found that the aforementioned catalysts were either less effective or not effective when utilized for making polyetherimides from aromatic bis(ether anhydride) and organic diamine under solution polymerization conditions. In addition, the presence of chloride ion may interfere with the use of such polyetherimide in electrical applications. Various metal compounds were also used to catalyze polyetherimide formation by imideamine exchange reactions, as shown by U.S. Pat. No. 3,847,870, Takekoshi and U.S. Pat. No. 3,850,885, Takekoshi et al, assigned to the same assignee as the present invention. However, the nature of the polymerization is quite different from polyetherimide formation by the melt polymerization of aromatic bis(ether anhydride) and organic diamine, which is amine-anhydride interaction rather than imideamine exchange.

Statement of the Invention

The present invention is based on the discovery that certain quaternary salts of Group Va elements, for example, tetraalkyl ammonium halides, trialkylammonium hydrohalides and tetraphenylphosphonium halides, etc., can enhance the rate of formation of such aromatic polyetherimides resulting from aromatic bis(ether anhydride) and organic diamine interaction under melt polymerization or solution polymerization conditions when such Group VA catalysts are utilized in an effective amount in the polymerization mixture.

There is provided by the present invention, a method for making aromatic polyetherimide which comprises, (1) effecting reaction between a $C_{(6-30)}$ aromatic bis(ether anhydride) and a $C_{(2-20)}$ aromatic diamine in the presence of an effective amount of an quaternary salt catalyst of a Group Va element selected from the class consisting of nitrogen and phosphorous, and (2) recovering the aromatic polyetherimide from the mixture of (1).

Among the aromatic organic dianhydrides which can be utilized in the practice of the invention are aromatic bis(ether anhydride)s of the formula,

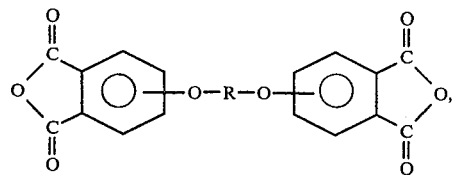

where R is a divalent aromatic organic radical having from 6-30 carbon atoms. In addition to the aromatic bis(ether anhydride)s of formula (1) there also can be used other aromatic bisanhydrides, for example,

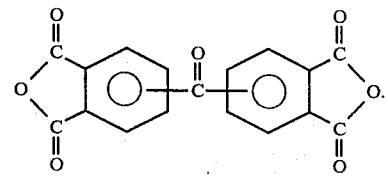

Organic diamines which can be utilized in the practice of the invention are included by the following formula, $$H_2NR^1NH_2 \qquad (2)$$

where $R^1$ is a divalent organic radical selected from R radicals, alkylene radicals having from 2-20 carbon radicals, cyclo alkylene radicals and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chlorophenylene, napthalene, etc., and radicals included by the formula,

where $R^2$ is a divalent aromatic radical having 6-13 carbon atoms selected from hydrocarbon radicals and halogenated hydrocarbon radicals, and Q is a divalent organo radical selected from $—C_yH_{2y}—$,

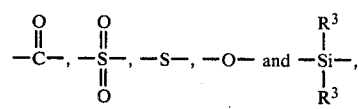

where a is 0 or 1, y is an integer having a value of from 1-5 inclusive, and $R^3$ is a monovalent hydrocarbon radical selected from methyl, phenyl, etc.

Radicals included by $R^1$ are, for example,

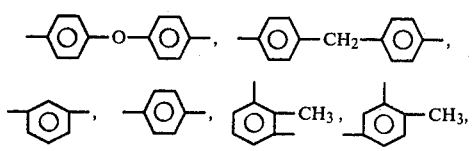

etc.; alkylene radicals such as hexamethylene, etc., cyclohexylene,

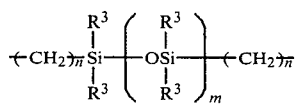

where $R^3$ is as defined above, m is equal to 0 to 100 inclusive and n is 2–8 inclusive.

Included by the aromatic bis(ether anhydride) of formula (1) which can be used in the practice of the present invention are, for example,

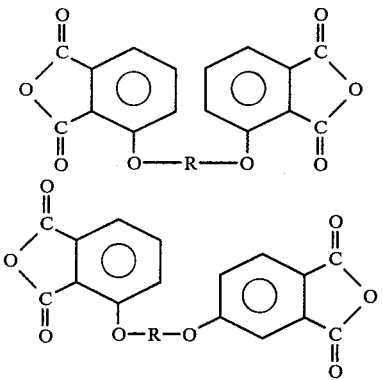

where R is as defined above.

Dianhydrides included by formula (4) are, for example,
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenylsulfide dianhydride;
1,4-bis(2,3-dicarboxyphenoxy)benzene dianhydride;
4,4'-bis(2,3-dicarboxyphenoxy)diphenylsulfone dianhydride; etc.

Dianhydrides included by formulas (3) and (5) are, for example,
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'-(3,4-dicarboxyphenoxy)-2,2-diphenylpropane dianhydride, etc.

Included by the organic diamines of formula (2) are, for example,
m-phenylenediamine;
p-phenylenediamine;
4,4'-diaminodiphenylpropane;
4,4-diaminodiphenylmethane; benzidine;
4,4'-diaminodiphenylsulfide;
4,4'-diaminodiphenylsulfone;
4,4'-diaminodiphenyl ether;
1,5-diaminonapthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

Quaternary Group Va catalysts which have been found to be in the practice of the method of the present invention are, for example,
tributylmethylammonium benzoate;
tetramethylammonium benzoate;
tetrabutylammonium benzoate;
tetrabutylammonium acetate;
bis(tetramethylammonium)phthalate;
bis(tetraethylammonium)phthalate;
bis(tetrabutylammonium)phthalate;
tris(tetrabutylammonium)trimellitate;
tetrabutylammonium chloride;
tributylammonium chloride;
tetraphenylphosphonium bromide;
bis(tetraphenylphosphonium)isophthalate;
tetrabutylphosphonium benzoate;
tetrabutylarsonium benzoate;
tetrabutylstibonium bromide, etc.

In the practice of the present invention, reaction can be effected between an organic dianhydride and an organic diamine in the presence of the Group Va salts which hereinafter will represent the aforedescribed tetralkylammonium halides, trialkylammonium hydrohalides, etc., under solution polymerization conditions at a temperature in the range of from 130° C. to 300° C. or under melt polymerization conditions at a temperature in the range of from 250° C. to 350° C.

In instances where solution polymerization is practiced, there can be utilized various organic solvents, for example, chlorobenzene;
o-dichlorobenzene;
m-dichlorobenzene;
1,2,4-trichlorobenzene;
4-chlorotoluene;
bromobenzene;
biphenyl;
phenyl ether, etc.

It has been found that a proportion of from about 0.9 to 1.1 moles of organic diamine, per mole of organic dianhydride can be used, while substantially equal molar amounts of such reactants along with appropriate quantities of chain-stoppers, such as aniline or phthalic anhydride, are preferred. The solids concentration of at least 10% by weight to 50% by weight during solution polymerization has been found to be effective.

Group Va catalyst can be used at a concentration of from 0.2 to 5% by weight, based on the weight, based on the weight of total solids in the polymerization mixture and vary within this range, depending upon the particular structure of the Group Va catalyst used.

Reaction times can vary widely depending upon the particular aromatic organic dianhydride and organic diamine utilized, as well as the temperature of the reaction. However, an enhancement of the rate of reaction will be effected and readily discernable as the result of the use of the amine catalyst.

In instances where melt polymerization is employed, substantially similar proportions of reactants and catalysts as described above for solution polymerization can be utilized in the absence of organic solvent. Melt polymerization can be achieved satisfactorily in a melt extruder, as taught, for example, by Mellinger et al, U.S. Pat. No. 4,073,773.

The polyetherimides made in accordance with the practice of the present invention can be employed as high performance injection moldable thermoplastics. Depending upon the nature of the organic dianhydride and the organic diamine utilized, the resulting polyimides also can be utilized in a variety of other applications, for example, insulation, films, wire coatings, glass and graphite fiber composites, laminates, etc.

In order that those skilled in the art will be better able to practice the invention, the following examples are given by way of illustration and not by way of limitation. All parts are by weight.

EXAMPLE 1

A mixture of 163 parts of o-dichlorobenzene, 67.66 parts of 2,2-bis[4-(3,4-dicarboxyphenoxy)phenyl]propane dianhydride, 13.64 parts of metaphenylene diamine, 0.72 part of aniline and 0.80 part of Group Va catalyst was stirred under a nitrogen atmosphere and immersed in an oil bath preheated to 145° C. The oil bath was then heated over a 60 minute time period to 195° C.

Within 5 minutes of the start of the reaction, precipitation of an intermediate reaction product was noted. With increased stirring, the solids began to go back into solution and evolution of water was noted. After 60 minutes, the o-dichlorobenzene began to reflux and aliquots of mixture were removed for GPC analysis. Additional samples were taken at intervals of 0.5, 2, 4, 6 and 22 hours.

A portion of each sample was diluted with chloroform immediately upon removal from the reaction mixture for GPC analysis. The remainder of each sample was diluted with chloroform and precipitated from solution with a 10 fold volume of methanol, followed by filtration, washing the precipitate and drying.

Some of the Group Va salts utilized as catalyst as shown in the Table below were prepared from tetraalkylammonium hydroxide with an appropriate aromatic acid, for example, benzoic acid compound (III), phthalic acid (I) and isophthalic acid (II). Compounds (II) and (III) were prepared as follows: There was added 0.02 moles of aqueous tetra-butylammonium hydroxide in the form of a 40.7% aqueous solution to 0.01 mole of the appropriate phthalic acid. Additional water was added to facilitate dissolving of the acid. The resulting mixture was warmed on a steam bath for 5 minutes then evaporated to dryness on a rotary evaporator. In the following Table, weight percent is based on the weight of the anticipated polyetherimide:

TABLE I

| Catalyst Compound | WT % | $\bar{M}w$ ($\times 10^{-3}$)[a] at time | | | | | $[\eta]$ at time | |
|---|---|---|---|---|---|---|---|---|
| | | .5 hr | 1 hr | 2 hr | 4 hr | 6 hr | 1 hr | 6 hr |
| Control | 0.0 | 7 | 10 | 14 | 20 | 23 | .24 | .35 |
| I[b,c] | 3.0 | 8 | 10 | 14 | 22 | 29 | .22 | .42 |
| I[b,c] | 1.0 | 17 | 20 | 23 | 29 | 26 | .32 | .46 |
| I[b] | 0.1 | 16 | 18 | 19 | 20 | 24 | .34 | .38 |
| I[d] | 1.0 | 18 | 22 | 25 | 28 | 27 | .36 | .43 |
| I[d] | 0.1 | 17 | 17 | 22 | 22 | 21 | .25 | .33 |
| II | 1.0 | 24 | 26 | 28 | 28 | 31 | .48 | .48 |
| II | 0.1 | 12 | 16 | 20 | 22 | 25 | .32 | .41 |
| III | 0.3 | 21 | 25 | 26 | 26 | 29 | .44 | .48 |
| III | .1 | 15 | 19 | 23 | 23 | 24 | .33 | .35 |
| III | .05 | 14 | 17 | 19 | 19 | 25 | .33 | .36 |
| Bu4NCl | 1.0 | 18 | 21 | 26 | 28 | 28 | .38 | .46 |
| φ4PBr | 1.0 | — | — | — | — | — | .33 | .47 |
| Bu3N . HCl | 1.0 | 26 | 25 | 25 | 28 | 31 | .43 | .47 |
| " | 0.1 | — | 14 | — | — | 23 | .25 | .39 |
| Benzoic Acid | 0.1 | — | 14 | — | — | 19 | .23 | .31 |

[a]$\bar{M}w$ by GPC with polystyrene calibration corrected to polyetherimide by a Q factor of 0.60.
[b]Added in aqueous solution.
[c]Catalyst used as chain terminator.
[d]Used along with phthalic anhydride as chain terminator.

EXAMPLE 2

A mixture of 65.6 parts of 2,2-bis[4-(3,4-dicarboxyphenoxy)phenyl]propane dianhydride, 14.06 parts of meta-phenylene diamine and 1.155 part of phthalic anhydride was dry blended in a Waring blender. A mixture of 10 parts of the blend and 0.02 part of the Group Va catalyst was blended further and then heated in an open glass tube in an aluminum block which was being heated from 265° C. to 280° C. over a 10 minute period. During this period, the temperature of the mixture rose to 280° C. The resulting product was then dissolved in chloroform to form a 5% solution and precipitated with 5 volumes of methanol. The resulting product was then washed and dried and then analyzed by GPC.

The following results were obtained:

TABLE II

| Group VA Catalyst | WT % | $\bar{M}w \times 10^{-3}$** |
|---|---|---|
| Control | None | 17 |
| Tetrabutylammonium | 0.5 | 22 |

TABLE II-continued

| Group VA Catalyst | WT % | $\overline{M}w \times 10^{-3}$** |
|---|---|---|
| benzoate* | | 5 |

*Added as a 33% aqueous solution
**Weight average molecular weight based on PS calibration corrected to polyetherimide.

The above results show that the Group Va catalyst of the present invention is an effective polymerization catalyst under melt polymerization conditions.

Although the above examples are directed to only a few of the very many variables within the scope of the present invention, it should be understood that the present invention is directed to the use of a much broader variety of organic dianhydrides and organic diamines and Group Va catalysts.

What we claim as new and desire to secure by Letters Patent of the United States is:

1. A method for making aromatic polyetherimide which comprises,
   (1) effecting reaction between a $C_{(6-30)}$ aromatic bisanhydride and a $C_{(2-20)}$ aromatic diamine in the presence of an effective amount of a quaternary salt catalyst of a Group Va element selected from the class consisting of nitrogen and phosphorous, and
   (2) recovering the aromatic polyetherimide from the mixture of (1).
2. A method in accordance with claim 1, where the reaction is conducted under melt polymerization conditions.
3. A method in accordance with claim 1, where the reaction is conducted under solution polymerization conditions.
4. A method in accordance with claim 1, where the Group Va catalyst is a quaternary ammonium salt.
5. A method in accordance with claim 1, where the Group Va catalyst is a quaternary phosphonium salt.
6. A method in accordance with claim 1, where the aromatic bisanhydride is an aromatic bis(ether anhydride).

* * * * *